US009958843B2

(12) United States Patent
Yamasaki et al.

(10) Patent No.: US 9,958,843 B2
(45) Date of Patent: May 1, 2018

(54) SYSTEM AND PROGRAM FOR MANAGING MANAGEMENT TARGET SYSTEM

(71) Applicant: Hitachi, Ltd., Tokyo (JP)

(72) Inventors: Kenta Yamasaki, Tokyo (JP); Mariko Miyaki, Tokyo (JP); Yoko Shiga, Tokyo (JP); Tomohiro Morimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 14/427,653

(22) PCT Filed: Nov. 7, 2012

(86) PCT No.: PCT/JP2012/078888
§ 371 (c)(1),
(2) Date: Mar. 12, 2015

(87) PCT Pub. No.: WO2014/073060
PCT Pub. Date: May 15, 2014

(65) Prior Publication Data
US 2015/0248119 A1 Sep. 3, 2015

(51) Int. Cl.
*H04L 12/24* (2006.01)
*G05B 15/02* (2006.01)
(Continued)

(52) U.S. Cl.
CPC ............ *G05B 15/02* (2013.01); *G06F 11/321* (2013.01); *H04L 41/12* (2013.01); *H04L 41/069* (2013.01);
(Continued)

(58) Field of Classification Search
CPC ..................................................... G06F 11/321
See application file for complete search history.

(56) References Cited

U.S. PATENT DOCUMENTS 6,650,731 B1 * 11/2003 Steltner ................ H04Q 3/0091 379/15.01
7,873,594 B2 * 1/2011 Harada .................. G06Q 10/00 707/603
(Continued)

FOREIGN PATENT DOCUMENTS

JP 2006-338599 A 12/2006
JP 2008-118068 A 5/2008
(Continued)

OTHER PUBLICATIONS

Japanese Office Action received in corresponding Japanese Application No. 2014-545493 dated Mar. 1, 2016.

*Primary Examiner* — William Bashore
*Assistant Examiner* — Nathan Shrewsbury
(74) *Attorney, Agent, or Firm* — Mattingly & Malur, PC

(57) ABSTRACT

A management system has a topology display screen of a management target system with an area, where icons of system components are typically displayed in the related art, which is embedded and displayed with a graph of a monitor value of the system component. A band having a predetermined width is displayed to show a relation between system display objects indicating the system components. The width of the band is determined by the number of requests which are transmitted or received by the system components. When a time-sequential graph of the monitor value of a system component is displayed, a vertical bar which can be operated by an input/output device is displayed in the graph. When the operation of the vertical bar is detected, an icon indicating integrity of the management target system at a time indicated by the vertical bar is displayed in the vicinity of the vertical bar.

11 Claims, 23 Drawing Sheets

(51) Int. Cl.
*G06F 11/32* (2006.01)
*H04L 12/26* (2006.01)

(52) U.S. Cl.
CPC ........ *H04L 41/5032* (2013.01); *H04L 43/067* (2013.01); *H04L 43/0817* (2013.01); *H04L 43/16* (2013.01)

(56) References Cited

U.S. PATENT DOCUMENTS

D640,264 S 6/2011 Fujii et al.
2004/0030741 A1* 2/2004 Wolton ............. G06F 17/30873 709/202
2006/0106847 A1* 5/2006 Eckardt, III ...... G06F 17/30696
2006/0274060 A1 12/2006 Ni et al.
2008/0048980 A1* 2/2008 Love ..................... G06F 1/1613 345/158
2008/0098454 A1* 4/2008 Toh ..................... H04L 41/0622 726/1
2009/0080698 A1* 3/2009 Mihara ............. G06F 17/30784 382/103
2010/0002071 A1* 1/2010 Ahiska ................... H04N 5/217 348/36
2010/0100546 A1* 4/2010 Kohler .............. G06F 17/30017 707/739
2010/0110932 A1* 5/2010 Doran ..................... H04L 41/22 370/254
2011/0277034 A1* 11/2011 Hanson ................. G06F 21/554 726/25
2012/0069131 A1* 3/2012 Abelow ............... G06Q 10/067 348/14.01
2013/0016129 A1* 1/2013 Gossweiler, III ....... G06F 3/012 345/667
2013/0082978 A1* 4/2013 Horvitz ................... G06F 3/017 345/175
2013/0218688 A1* 8/2013 Roos ................. G06F 17/30061 705/14.69
2013/0302763 A1* 11/2013 Edwards .................. G09B 1/36 434/159
2013/0335405 A1* 12/2013 Scavezze ................ G06T 19/20 345/419
2014/0108915 A1* 4/2014 Lu ....................... G06F 17/2247 715/234
2015/0189243 A1* 7/2015 Cucco ....................... G06T 7/20 348/157
2016/0026253 A1* 1/2016 Bradski ................ G02B 27/225 345/8
2016/0054971 A1* 2/2016 Yu ............................ H04N 7/15 345/2.1
2016/0162245 A1* 6/2016 Choi ..................... G06F 3/1446 345/1.3
2016/0253067 A1* 9/2016 Webb .................... G06F 3/0482 463/31
2016/0253839 A1* 9/2016 Cole ....................... G06F 3/012 345/420
2016/0300252 A1* 10/2016 Frank ................. G06Q 30/0203
2016/0379079 A1* 12/2016 Han ................... G06K 9/00255 382/190
2017/0026573 A1* 1/2017 Lee .................... H04N 5/23238
2017/0056774 A1* 3/2017 Oka ...................... A63F 13/655

FOREIGN PATENT DOCUMENTS

JP 2011-517346 A 6/2011
WO 2009/122626 A1 10/2009

* cited by examiner

Fig. 3

| Component ID | Category | Name | Display position | Display screen number |
|---|---|---|---|---|
| C-1 | Web | VM1 | 1 | 1 |
| C-2 | Web | VM2 | 2 | 1 |
| C-3 | Web | VM3 | 3 | 1 |
| C-4 | Web | VM4 | 4 | 1 |
| C-5 | Web | VM5 | 5 | 1 |
| C-6 | App | VM6 | 1 | 1 |
| C-7 | App | VM7 | 2 | 1 |
| C-8 | App | VM8 | 3 | 1 |
| C-9 | App | VM9 | 4 | 1 |
| . . . | . . . | . . . | . . . | . . . |

Fig. 4

| Display screen number | Screen information |
|---|---|
| 1 | CPU |
| 2 | Memory |
| 3 | Network |
| 4 | Storage access |
| . . . | . . . |

Fig. 5A

CPU load information

| Acquisition time | Monitor value[%] |
|---|---|
| 2012/10/30 16:00:00 | 12 |
| 2012/10/30 16:01:00 | 11 |
| 2012/10/30 16:02:00 | 11 |
| 2012/10/30 16:03:00 | 10 |
| 2012/10/30 16:04:00 | 15 |
| . . . | . . . |

Memory usage information

| Acquisition time | Monitor value[%] |
|---|---|
| 2012/10/30 16:00:00 | 78 |
| 2012/10/30 16:01:00 | 78 |
| 2012/10/30 16:02:00 | 78 |
| 2012/10/30 16:03:00 | 79 |
| 2012/10/30 16:04:00 | 79 |
| . . . | . . . |

Fig. 5B

Network performance information

| Acquisition time | Monitor value: reception [KB/s] | Monitor value: transmission [KB/s] |
|---|---|---|
| 2012/10/30 16:00:00 | 242 | 62 |
| 2012/10/30 16:01:00 | 232 | 55 |
| 2012/10/30 16:02:00 | 224 | 66 |
| 2012/10/30 16:03:00 | 242 | 50 |
| 2012/10/30 16:04:00 | 292 | 49 |
| . . . | . . . | . . . |

Storage access performance information

| Acquisition time | Monitor value: read[KB/s] | Monitor value: write[KB/s] |
|---|---|---|
| 2012/10/30 16:00:00 | 42 | 23 |
| 2012/10/30 16:01:00 | 51 | 11 |
| 2012/10/30 16:02:00 | 43 | 32 |
| 2012/10/30 16:03:00 | 44 | 21 |
| 2012/10/30 16:04:00 | 62 | 28 |
| . . . | . . . | . . . |

Fig. 5C

CPU performance information per process

| Acquisition time | Process name | Monitor value[%] | Process name | Monitor value[%] | . . . |
|---|---|---|---|---|---|
| 2012/10/30 16:00:00 | SQL Server | 10 | taskmgr | 0.5 | . . . |
| 2012/10/30 16:01:00 | SQL Server | 9 | taskmgr | 1.0 | . . . |
| 2012/10/30 16:02:00 | SQL Server | 9 | taskmgr | 0.2 | . . . |
| 2012/10/30 16:03:00 | SQL Server | 9 | taskmgr | 0.1 | . . . |
| 2012/10/30 16:04:00 | SQL Server | 11 | taskmgr | 0.3 | . . . |
| . . . | . . . | . . . | . . . | . . . | . . . |

Fig. 6

| Failure ID | Occurrence source | Status | Occurrence time |
|---|---|---|---|
| EV1 | C- 9 | Threshold error | 2012/10/30 16:01:00 |
| . . . | . . . | . . . | . . . |

Fig. 7

| Request ID | Transmission source component ID | Transmission destination component ID | Client ID | Number of requests | Response time [ms] | Status |
|---|---|---|---|---|---|---|
| R001 | NULL | C-2 | CL01 | 500 | 50 | Normal |
| R002 | NULL | C-2 | CL02 | 300 | 1200 | Violation |
| . . . | . . . | . . . | . . . | . . . | . . . | . . . |
| R010 | C-2 | C-6 | CL01 | 250 | - | - |
| R011 | C-2 | C-7 | CL01 | 250 | - | - |
| R012 | C-2 | C-7 | CL02 | 300 | - | - |
| R013 | C-7 | C-10 | CL01 | 800 | - | - |
| R014 | C-7 | C-11 | CL02 | 500 | - | - |
| . . . | . . . | . . . | . . . | . . . | . . . | . . . |

Fig. 8

| Request ID | Transmissi-on source component ID | Transmissi-on destination component ID | Client ID | Number of requests | Response time [ms] | Status |
|---|---|---|---|---|---|---|
| R002 | NULL | C-2 | CL02 | 300 | 1200 | Violation |
| R012 | C-2 | C-7 | CL02 | 300 | - | - |
| R014 | C-7 | C-11 | CL02 | 500 | - | - |
| . . . | . . . | . . . | . . . | . . . | . . . | . . . |

Fig. 9

| Correlation analysis result | Component name | Relevant monitor item |
|---|---|---|
| | C-1 | Memory |
| | C-6 | Memory |
| | C-10 | CPU |

SYSTEM AND PROGRAM FOR MANAGING MANAGEMENT TARGET SYSTEM

TECHNICAL FIELD

The present invention relates to a user interface which provides an information system topology display.

BACKGROUND ART

A management target system which includes a storage apparatus, a server computer, and a network apparatus is increased in size, and thus it is difficult for an administrator to confirm a relation (that is, topology) between management target apparatuses coupled to each other. For this problem, a management server disclosed in each of PTLs 1 and 2 displays a topology of the management target system, and in a case where it is detected that the management target apparatus is overloaded, an icon indicating the overload is displayed on an icon indicating the overloaded monitor target apparatus. In addition, PTL 1 discloses that various types of monitor values of the management target system are displayed as icons in a screen area separately from a topology display.

CITATION LIST

Patent Literature

[PTL 1] US D64026451
[PTL 2] WO 2009/122626

SUMMARY OF INVENTION

Technical Problem

In a case where the management target system is managed, the monitor values of system components (indicating various types of apparatuses or/and physical or virtual components included in the apparatus) included in the management target system have a relation between a plurality of values in some cases. Therefore, the administrator manages the management target system with reference to the plurality of monitor values. However, in the technology disclosed in each of PTLs 1 and 2, the administrator is not allowed to view the plurality of monitor values at the same time, so that management efficiency of the administrator is degraded.

Solution to Problem

In order to improve the management efficiency of the administrator, a management system performs one or more items in the following (1) to (3).

(1) With a topology display screen of a management target system, the management system displays a graph of a monitor value of the system component to be embedded in an area where icons of system components included in the management target system are displayed in the related art.

(2) The management system displays a band having a predetermined width to show a relation between system display objects indicating the system components. Further, the width of the band is determined based on the number of requests which are transmitted or received by the system components.

(3) In a case where a time-sequential graph of the monitor value of the system component is displayed, the management system displays a vertical bar which can be operated by an input/output device in the graph. When the operation of the vertical bar is detected by the input/output device, the management system specifies a time indicated by the vertical bar, and displays an icon indicating integrity (information on whether an external request satisfies an SLA (Service Level Agreement) or the like) of the management target system at that time in the vicinity of the vertical bar.

Advantageous Effects of Invention

According to the above-mentioned management system, the management efficiency of the administrator is improved. More specifically, even when the items (1) to (3) are expressed separately from each other among the items (1) to (3), the following effects are expected.

Effect of (1): A viewpoint shifting distance for viewing the monitor value of the system component from the topology display of the management target system becomes shorter (even an operation amount for scrolling and dragging the screen in some cases).

Effect of (2): The number of requests which are transmitted or received by predetermined system components can be confirmed while confirming the topology display, so that the viewpoint shifting distance becomes shorter (even an operation amount for scrolling and dragging the screen in some cases).

Effect of (3): The administrator can confirm the monitor value of the system component and the integrity of the management target system while nearly not moving the viewpoint.

However, when the items (1) to (3) are realized in combination, for example, the following new effects are expected.

A combination of (1) and (2): When the vicinity of the graph of the predetermined system component in the topology display is viewed, the number of requests which are transmitted or received by the system components can be confirmed based on the thickness of the band, so that the administrator can confirm the transmission source or the transmission destination of the request which affects the monitor value.

A combination of (1) and (3): The integrity such as an SLA of the management target system is monitored by the system component (that is, the system component on the front end side) which receives the request from the outside of the system, and in the case of the topology display of a complicated management system, the monitoring target system component on the back end side can be disposed at a display position different from the system component on the front end side of the topology display. Therefore, when the icon having the integrity of (3) is displayed using a graph in the topology display of (1), the administrator can confirm and/or analyze the monitor value of the system component based on the integrity of the management target system while suppressing the viewpoint shifting distance (even an operation amount for scrolling and dragging the screen in some cases).

BRIEF DESCRIPTION OF DRAWINGS

FIG. 3 is a diagram illustrating component system information of the Embodiment 1.

FIG. 4 is a diagram illustrating screen definition information of the Embodiment 1.

FIG. 5A is a diagram illustrating CPU load information and memory usage information as information on various types of performance values which are illustrated as an example of a monitor value in the Embodiment 1.

FIG. 5B is a diagram illustrating network performance information and storage access information as information on various types of performance values which are illustrated as an example of the monitor value in the Embodiment 1.

FIG. 5C is a diagram illustrating CPU performance information for each process as information on various types of performance values which are illustrated as an example of the monitor value in the Embodiment 1.

FIG. 6 is a diagram illustrating failure information of the Embodiment 1.

FIG. 7 is a diagram illustrating request management information of the Embodiment 1.

FIG. 8 is a diagram illustrating abnormal status request information which is temporarily generated from the request management information in the Embodiment 1.

FIG. 9 is a diagram illustrating correlation analysis result information of the Embodiment 1.

DESCRIPTION OF EMBODIMENTS

Hereinafter, embodiments will be described with reference to the drawings. Further, the invention described in claims is not limited by the embodiments described below, and all elements and a combination thereof described in the embodiments are not essential components for the solution of the invention.

Further, in the following description, information will be described as “aaa table”, “aaa list”, “aaa DB”, “aaa queue”, and the like in expression. However, it does not mean that the information has a data structure such as a table, a list, a DB, or a queue, and the information may be expressed besides such a data structure. Therefore, “aaa table”, “aaa list”, “aaa DB”, and “aaa queue” are called “aaa information” in some cases in order to indicate that the information does not depend on the data structure. Furthermore, when the content of the information is described, the expressions “identification information”, “identifier”, “name”, and “ID” are used, but these expressions can be replaced with each other. Furthermore, the expression “information” is used in order to show the data content, but another expression format may be employed.

In addition, in the following, the description may be given using “program” as a subject in a sentence. However, since the program is executed by a CPU so as to perform a predetermined process using a storage resource and a communication interface (I/O port, etc.), the description may be given using a computer or a system having the CPU as a subject. In addition, a management computer or a management system including the management computer may include hardware dedicated to some or all of the processes instead of the CPU (or in addition to the CPU).

In addition, various types of programs may be installed in the computer from a program distribution computer or a storage media. As a matter of course, such a program distribution server includes a storage resource in which a distribution target program and a distribution server program are stored, and the CPU which distributes the distribution target program to the computers by executing the distribution server program. Further, the program distribution server supports the installation of the distribution target program into each computer.

Embodiment 1

System Configuration

Figure 1:
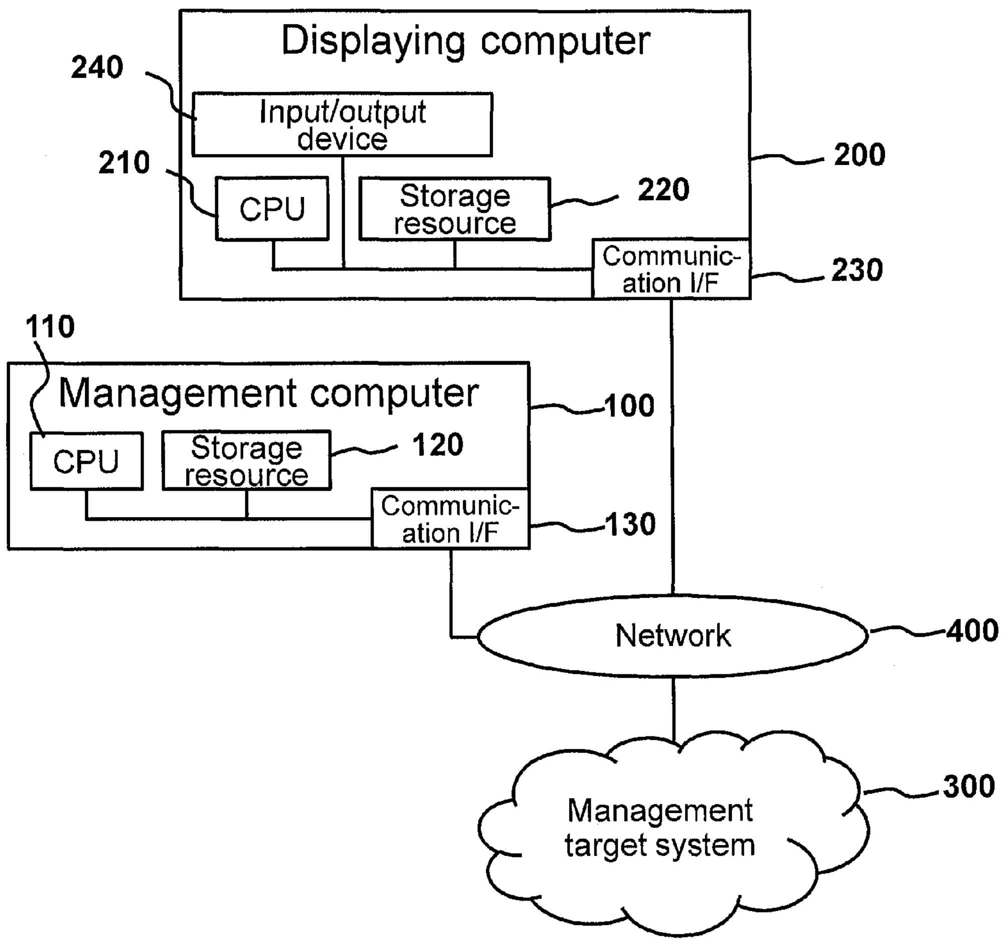
FIG. 1 is a diagram illustrating a system configuration of a Embodiment 1.

FIG. 1 is a diagram illustrating the outline of the Embodiment 1.

A computer system is a system comprising a management target system 300, a management computer 100, and a displaying computer 200 that are attached to network.

The management computer 100 is a computer which manages the management target system 300, and includes a CPU 110, a storage resource 120, and a communication interface 130. As described below, the storage resource 120 stores a management server program and various types of information of the management target system 300, and the CPU 110 performs various types of management processes by executing a management program. Further, the storage resource 120, for example, includes an HDD (Hard Disk Drive), flash memory, DRAM, and a combination thereof. Any device may be employed as the storage resource 120 as long as the device can store programs and information.

The displaying computer 200 is a computer which serves to perform an input/output operation with respect to the administrator, and includes a CPU 210, a storage resource 220, a communication interface 230, and an input/output device 240. Further, while not illustrated in the drawings, the CPU 210 executes a management display program stored in the storage resource 220. Further, the storage resource 220, for example, is considered to include the HDD, the flash memory, the DRAM, and a combination thereof. Any device may be employed as the storage resource 220 as long as the device can store programs and information.

Further, as an embodiment, the management display program may be a program which is generated by a flash application or a Web application technology. In this case, the management display program may share a partial function of handling a management process other than a screen display. However, since a sharing function of the management server program and the management display program is not important in this embodiment, the description hereinafter will be made like "the management program displays . . . in the input/output device 240" or "the management program receives . . . from the input/output device 240" for the sake of simplicity. At this time, the management program is the management server program or/and the management display program.

In addition, in the following description, the management computer 100 and the displaying computer 200 may be collectively called a "management system". In addition, the management computer 100 may be configured by a plurality of computers, and similarly the displaying computers 200 may be disposed at plural places.

In addition, in a case where the management display program is a Web application, the management display program is typically stored in the storage resource 120 of the management computer 100 at first, and downloaded from the displaying computer by making access to the management computer. However, the management display program may be directly installed in the displaying computer.

In addition, as the input/output device 240, a combination of a mouse and a display, a touch panel in the case of a smartphone or a tablet computer, and a natural user interface device are considered, and any other types may be employed.

The management target system 300 is a system which is a management target of the management system. The management target system 300, for example, includes a server computer, a network apparatus such as an IP switch or a router, and a NAS or a storage apparatus. Further, apparatuses included in the management target system 300 and/or physical or virtual components included in the apparatus are collectively called "system components". As an example of the system component, a port, a processor, a storage resource, a storage device, a program, a VM (Virtual Machine), a logical volume (an example of a component defined in the storage apparatus), a RAID group, an instance and/or a table of DBMS, an entity obtained by analyzing a URL tree provided by a Web server (for example, a virtual Web server handling a URL including http://www.aaa/customer1/is assumed and the virtual Web server is considered as a system component), a network service name, and an instance providing a network service are exemplified.

The management system acquires apparatus information such as configuration information of the management target system and the system component and information indicating a failure or a performance, and displays management information (for example, configuration information, the presence or absence of failure occurrence, a performance value, and the like) of the management target system based on the acquired apparatus information so as to support the administrator.

<Program and Information of Management System>

Figure 2:
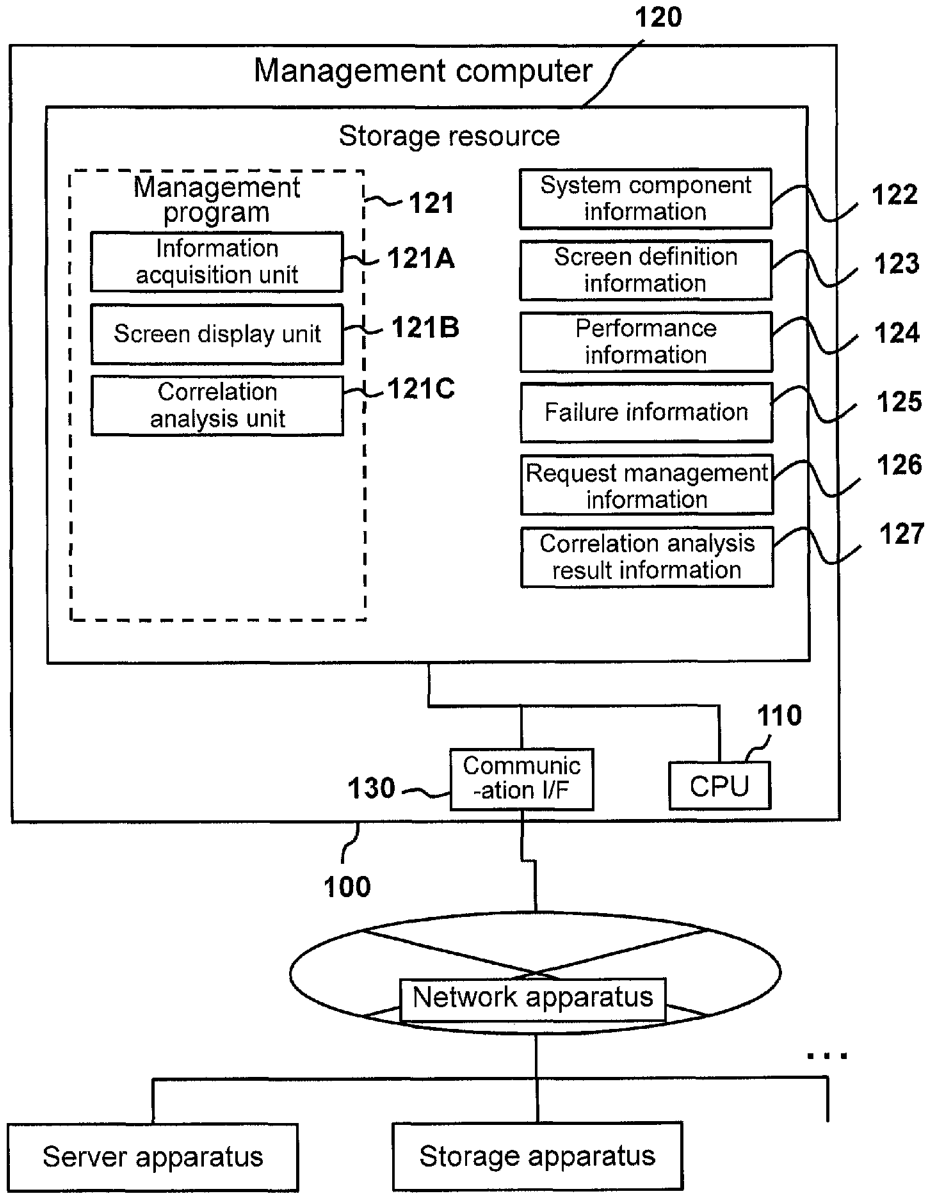
FIG. 2 is a diagram illustrating a configuration of a management computer or a management system of the Embodiment 1.

FIG. 2 is a diagram illustrating the details of the management computer 100. In the storage resource 120 of the management computer 100, the following information is stored.

System Component Information 122 of Management Target System

History of Monitor Value of System Component

Further, the monitor value may be a value through which the system component can be monitored, and for example, a performance value, a temperature, and the number of errors of the system component are also included. Further, since the performance value will be given as an example of the monitor value in the following description, performance information 123 is included in FIG. 2 (more generally speaking, monitor information), and it is a matter of course that a history of the monitor value is stored in the monitor information.

Failure Information 124 of System Component

The information 124 stores a failure content of the system component.

Request Management Information 125

The information 125 stores a request from the outside of the management target system and information of the request transmitted or received between the system components (for example, the number of requests per unit time or a response time).

Correlation Analysis Result Information 126

The information 126 stores a failure by a correlation analysis unit 121C of a management program 121 to be described below and an item of the monitor value relating to the failure.

In the storage resource 120, the management program 121 is stored. Further, the management program 121 includes the following functional portions. However, as described above, these functional portions may be the management server program or the management display program. In addition, some or all of the above information may be stored in the storage resource 220 of the displaying computer 200. Therefore, there is no problem even when the information is stored in the management system.

Information Acquisition Unit 121A

The information acquisition unit 121A receives the content stored in the information 122 to 126 from the system component (or through a monitor agent computer of the system component), and creates and updates the information 122 to 126. Further, the data received from the system component is not necessarily to have a format of FIGS. 3 to 9, but the information acquisition unit 121A may individually receive the respective items of the information, or may collectively receive these items as long as the information acquisition unit 121A can store the content described above. Further, the information is repeatedly acquired by the information acquisition unit 121A.

Screen Display Unit 121B

The screen display unit 121B controls the displaying with respect to the input/output device 240.

Correlation Analysis Unit 121C

The correlation analysis unit 121C associates the system component relating to the failure and a monitor item thereof using one or more information 122 to 126, and stores the system component and the monitor item in the correlation analysis result information 126. Further, the correlation analysis unit 121C may be another program different from the management program.

<Information Stored by Management System>

Next, the information stored by the management system will be described using FIGS. 3 to 6.

<<System Component Information>>

FIG. 3 illustrates the system component information 122. In this way, in the system component information 122, at least the name of the system component, a category, and a component ID used to manage a unique system component in the management system are stored. Further, in the system component information 122, information other than the name, the category, and the component ID may be further included. As an example, in FIG. 3, a display position and a display screen number for a topology display controller are stored together with each other. Further, the information for the topology display controller may be separately stored in another table. Further, the content of the information of FIG. 3 shows a case where the VM is used as a Web server, an application server, and a DBMS server.

<<Screen Definition Information>>

FIG. 4 illustrates screen definition information. The screen definition information is information in which a display order of items to be displayed by a topology display is stored. In the example of FIG. 4, the display order is denoted by a number called the display screen number.

<<Monitor Information>>

Next, the performance information 123 will be described as an example of the monitor information. FIGS. 5A to 5C are diagrams illustrating tables in which a CPU load, a memory usage, a network performance, a storage access performance, and a monitor value of the system component having the CPU load per process are stored as the monitor items. A common point between the respective tables is that an acquisition time and the monitor value are bounded as a set to store the history of the monitor value.

Further, in the examples of FIGS. 5A to 5C, one table stores the monitor value of one component, and this table is generated per component. However, a storage pattern of the performance information 123 and the monitor information may be different from the above-described. For example, when the monitor item, the acquisition time, and the monitor value are bounded as a set to store the history of the monitor value, the monitor values of one system component can be collected in one table. As another example, when the system component ID, the monitor item, the acquisition time, and the monitor value are bounded as a set to store the history of the monitor value, the monitor values of all the system components can be collected in one table. On the contrary, the tables may be collected per item.

<<Failure Information>>

FIG. 6 is a diagram illustrating the failure information 124. The failure information may indicate at least a system component in which a failure occurs, and in the drawing, a failure occurrence time point and a failure status are also stored. Further, the failure information may be integrated with the configuration information and stored.

<<Request Management Information>>

FIG. 7 is a diagram illustrating request management information 126. This information indicates the number of requests (hereinafter, referred to as a "front end request") transmitted from a client to the system component on the front end side and a status indicating the integrity, and a state in which how many requests (hereinafter, referred to as a "back end request") are transmitted to the system component on a certain back end side after the front end request is branched. Then, in the example of FIG. 7, since the integrity of the front end request is considered to be determined per client, the branch is also managed per client. Further, alternatively, the determination on the integrity may be a management such as "a ratio of the request determined as an abnormal request exceeding a predetermined criterion among all the requests", and in this case, a client ID used to identify the client of FIG. 7 is not necessary. Further, hereinafter, the case of determination on the integrity per client according to the example of FIG. 7 will be described.

The request management information 126 stores the following points as a row in order to show the above content.

(1) The number of front end requests per unit time, an average or maximum response time, and a state of the integrity which are received by the system component (indicated by a transmission destination component ID) on the front end side. These values are values counted in each client (indicated by the client ID).

(2) The number of transmitted back end requests per unit time in a state where the system component (indicated by a transmission source component ID) on the front end side or the back end side is a transmission source and the system component (indicated by the transmission destination component ID) on the back end side is a transmission destination. Similarly to (1), this number is a value counted in each client (indicated by the client ID).

Further, in a status column, a result obtained by determining the integrity based on the number of front end requests or the response time according to a predetermined criterion (typically the SLA) is stored. In addition, as the predetermined criterion for determining the integrity, for example, the following descriptions are considered.

The response time is compared with one or more thresholds configured by the administrator.

For example, when the response time described in the SLA is set to a first threshold, and in a case where the response time exceeds the first threshold, the status becomes "violation". Further, when 80% of the response time described in the SLA is set to a second threshold, and in a case where the response time exceeds the second threshold, the status becomes "warning".

A base line monitor is employed, and the past response time and the current response time are compared.

When a difference between both times is equal to or more than a certain level, the status becomes "abnormal".

However, other predetermined criteria may be employed.

Further, the request which is a management target of the request management information 126 may correspond to all the requests which are received by the system component, or may correspond to a request which satisfies a predetermined condition. The predetermined condition (that is, a filtering condition) may be input by the administrator. As an example of the predetermined condition, there are conditions on the type of the request, an argument of the request, and a data length (in the case of the request relating to the data transmission).

<<Abnormal Status Request Information>>

FIG. 8 is a diagram illustrating the abnormal status request information which is generated from the request management information 126. This information stores a row which satisfies the following condition (3) or (4) and is extracted from FIG. 7.

(3) A row relating to the front end request which is determined that the status is a predetermined status (for example, abnormal or violation).

(4) A row relating to the back end request which is branched from the front end request satisfying (3).

Further, the "branch of the request" indicates at least one of the transmission of the received request to one or more system components and the transmission of a new request created based on the received request to one or more system components.

<<Correlation Analysis Result Information>>

FIG. 9 is a diagram illustrating the correlation analysis result information. This information is a monitor item having a high correlation between the system component at the transmission destination of the back end request which is branched from the front end request described in (3) and the number of requests or the response time serving as the criteria of the predetermined status. Further, such a determination on the correlation is processed by the correlation analysis unit 121C of the management program 121.

<Screen Display of Management Program>

Next, the screen display of the management program will be described using FIGS. 10A to 10E.

<<Basic Topology Display>>

Figure 10A:
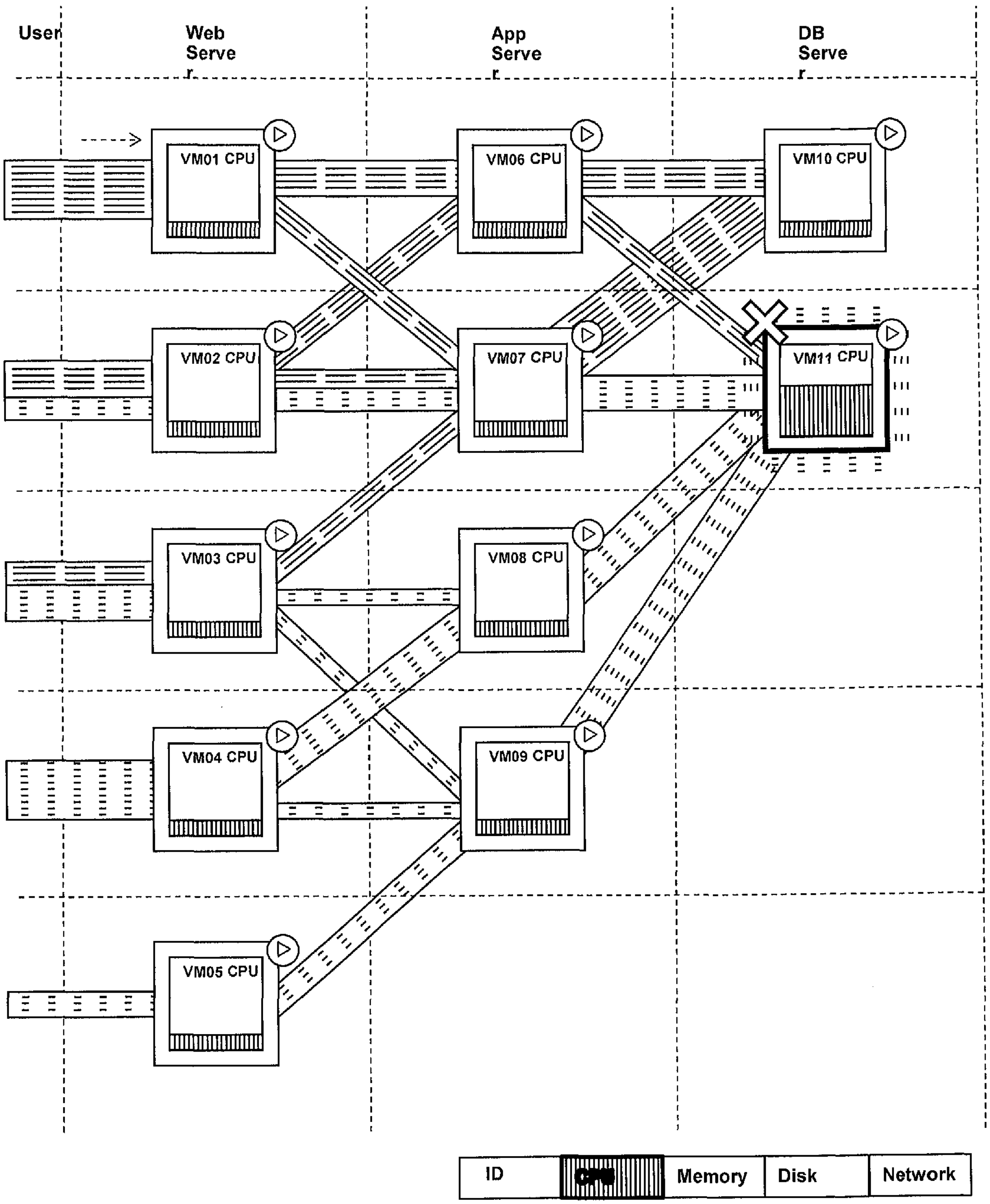
FIG. 10A is a diagram illustrating a first example of a screen display of the Embodiment 1.

FIG. 10A is a diagram illustrating a topology display screen which is displayed to the input/output device 240 by the management program. The topology display screen includes the following components.

A display object (referred to as a system display object) indicating the system component In the system display object, the monitor value (more preferably a graph of the monitor value) of the corresponding system component is displayed. Further, the monitor value to be displayed in this graph is a value which is stored in the monitor information. In the example of FIG. 10A, a graph of the CPU load is illustrated as the monitor value.

A band illustrated between the system display objects or between the system display object and a gush area described below Further, the request management information and the abnormal status request information are referred to display the band.

The gush area for imaging the outside of the management target system

In FIG. 10A, the gush area is a display area below "User" on the left side. Further, as illustrated in FIG. 10A, the gush area may be specifically not display the display object, but it is not essential.

A display indicating the monitor item corresponding to the graph in the display of the system display object (a bar on the immediate lower portion in the drawing)

(Option) a display object (referred to as a failure display object) indicating that a failure occurs in the system component In FIG. 10A, "×" of the system display object displayed with a VM 11 and ID is the failure display object. Further, the failure information 125 is referred to display the failure display object.

<<<Arrangement of System Display Objects>>>

In the example of FIG. 10A, a topology display area is divided in a grid pattern, and the system display object of a category determined for each column of the grid is disposed. Therefore, an image in which the request from the outside of the management target system is sequentially processed from the system display object on the left side can be provided to the administrator. In addition, in a case where the administrator looks for the system display object belonging to a certain category, the administrator can find out a target system display object when the administrator's eyes are shifted up and down along the corresponding column.

Further, when the system display object is disposed onto the column and the row, there may be set an arrangement criterion such that the displaying bands are not overlapped with each other so as not to degrade visibility.

<<<As for Method of Alternating Bands Indicating Request>>>

In the example of FIG. 10A, in order to visually display the number of requests, the management program determines a width of the band based on the number of requests, and displays the band having the determined width. Furthermore, the management program displays a part of the band by changing the color thereof in order to visually display the abnormal request such as a violation or warning status (in FIG. 10A, a different color is displayed by a different hatching pattern). The administrator can visually confirm the number of abnormal requests by a ratio of the bands having a different color. In particular, in a case where the input/output device (or the displaying computer) has a function of displaying the topology display on a magnified scale (for example, zooming-in/out in response to the mouse wheel, and pinch-in/out in a touch panel), the width of the band is also displayed on a magnified scale, so that it is possible to make visual confirmation with higher accuracy.

Further, a plurality of lines in a direction of the long side may be displayed inside the band in order to exert a higher visual effect. With this configuration, each line indicates one request, and an image illustrating a bundle of the bands can be given to the administrator. Furthermore, in order to illustrate an image that the management target system receives the request from the outside and processes the request, the band may be illustrated periodically brighter from the gush area.

Further, as a method of making the number of requests differently displayed, the band is displayed while changing the lines, and line colors may be changed (different according to the number of requests) according to the number of requests. Even in this method, the administrator can visually confirm the number of requests. However, the number of colors and gray scales expressed by the input/output device has a limit, and thus a visual accuracy for confirmation is not increased even when the topology display is magnified. In addition, using the colored lines, it is difficult to make visual confirmation on the number of requests and the ratio of the abnormal requests at the same time.

<<<Merit of Topology Display>>>

The topology display of FIG. 10A has at least the following points.

(1) With the topology display screen of the management target system, the graph of the monitor value of the system component are displayed to be embedded in an area where icons of the system components included in the management target system are displayed in the related art.

(2) The band having a predetermined width is displayed to show a relation between the system display objects indicating the system components. Further, the width of the band is determined based on the number of requests which are transmitted or received by the system components.

Therefore, the following points, for example, are given as merits.

(1) A viewpoint shifting distance for viewing the monitor value of the system component from the topology display of the management target system becomes shorter (even an operation amount for scrolling and dragging the screen becomes smaller in some cases). As an circumstance to make the merit remarkably exhibited, there is (A) a case where the topology display is magnified, or (B) a case where the topology display is viewed while magnifying or compressing the topology display (for example, the topology display is viewed while using the operations such as pinch-in/out and dragging of the touch panel). In such a circumstance, when the graph is displayed beyond the outside of the topology display, an average visual-line shifting distance becomes longer in order to turn the visual line away from the magnified topology display. In the case of (B), there is a need to view the graph outside the topology display while further operating the screen.

(2) The administrator can confirm the number of requests which are transmitted or received by predetermined system components while confirming the topology display, so that the viewpoint shifting distance becomes shorter (even an operation amount for scrolling and dragging the screen becomes smaller in some cases).

In a combination of (1) and (2), when the vicinity of the graph of the predetermined system component in the topology display is viewed, the number of requests which are transmitted or received by the system components can be confirmed based on the thickness of the band, so that it is possible to confirm the transmission source or the transmission destination of the request which affects the monitor value. For example, the graph of the system display object of the VM 11 of FIG. 10A shows that the CPU load is higher than other VMs, but it can be known that the number of requests received by the VM 11 is large based on the width of the band only by slightly viewing the peripheral portion of the VM 11. In addition, the color of the band can be seen only by slightly viewing the peripheral portion, and as a result it is possible to confirm that how many requests cause a high CPU load. Furthermore, it is possible to confirm the source (or an address) of the request which causes the high load by widening the adjacent system display objects in sight, and in some cases it is possible to make detailed analysis by confirming the graphs of the adjacent system display objects.

<<Case of Switching Display to Another Monitor Item>>

Figure 10B:
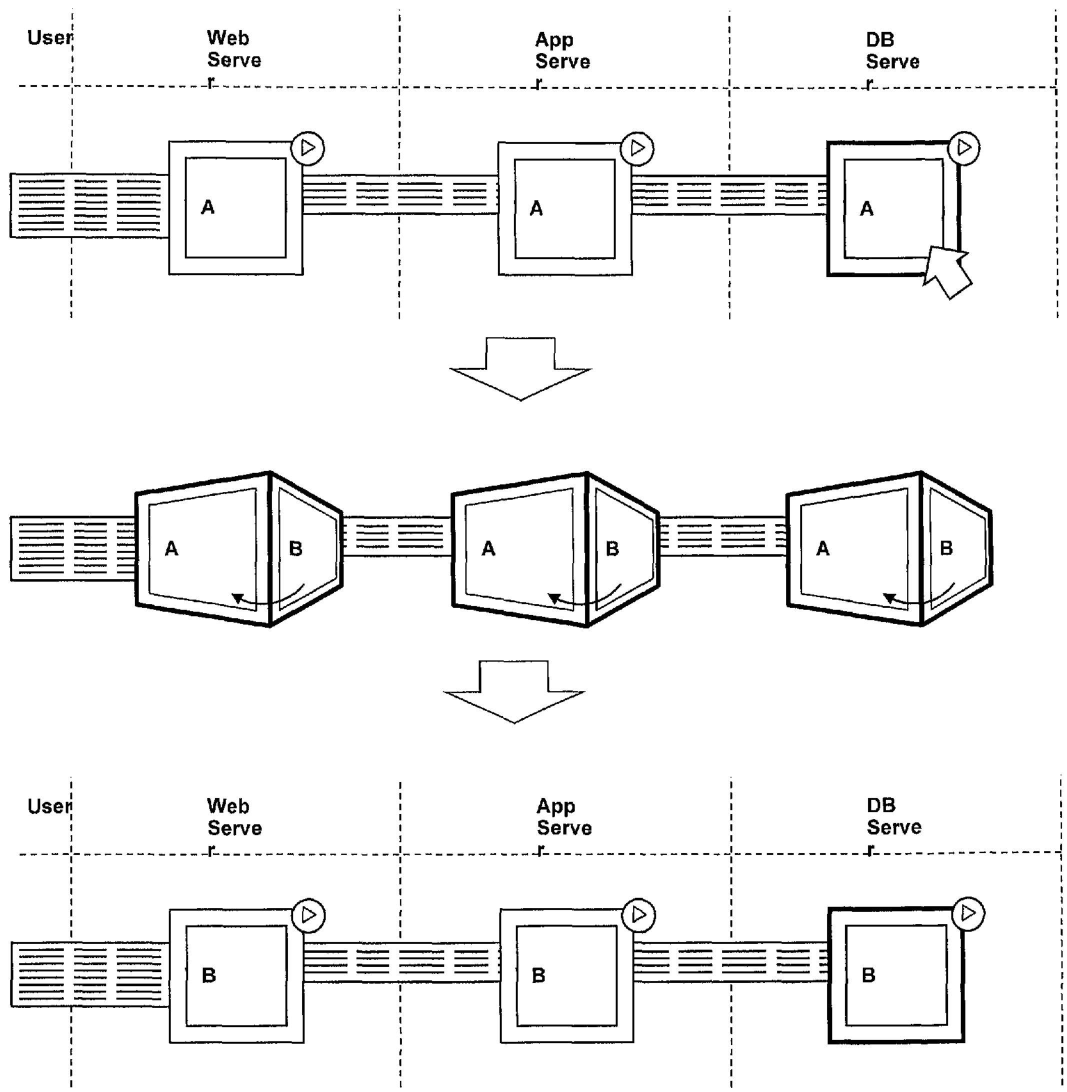
FIG. 10B is a diagram illustrating a second example of the screen display of the Embodiment 1.

A case where a display is switched to another monitor item will be described using FIG. 10B. In a graph display method of the monitor value by the system display object of FIG. 10A, a display area of the graph is restricted. Therefore, it is not preferable that the monitor values of too many items are displayed in a graph display area of one system monitor object for the sake of possible visibility. Instead, the management program expresses the system display object using a column, a polygonal column, or a plate, and rotates the animated object so as to switch the display to the graph display of another monitor item. In the example of FIG. 10B, a square column is rotated, and the rotation axis is configured in an upright direction when the screen is viewed from a side parallel to the screen and the front side. Then, the management program shows the display such that a graph before the switching to the side surface of the square column and a graph after the switching are stuck.

The upper stage of FIG. 10B illustrates the graph display before the switching. The center stage illustrates a state during a period when the graph display is switched from item A to item B. The lower stage illustrates a state after the graph display is switched to item B.

Further, a column or plate shape is preferably a regular polygonal column (the bottom is a column of a regular polygonal shape). In addition, except during the switching, it is preferable that the rotation is controlled to temporarily display only one column or plate. When the bottom is not the regular polygonal shape, the size of the graph is changed at every stop of the rotation. In addition, when the rotation is stopped in a state where two or more surfaces are temporarily displayed, each display area of the graph becomes smaller, and thus the visibility is degraded. However, the graph may be switched using a rotation body which does not satisfy such an appropriate condition. In addition, in the example of FIG. 10B, a three-dimensional display method using a two-point pass scheme has been employed in order to display the polygonal column, but a spatial effect may be expressed by another method, and the spatial effect may be not expressed.

In addition, the system monitor object is preferably a square column or a circular column. In the case of the square column or the circular column, the rotation is completely made by 90 degrees in order to display the next surface, and in the case of the plate, the rotation is necessarily made by 180 degrees, so that an extra animation processing time and a processing performance are required. In addition, the square column is preferable compared to the circular column because when a vertical rotation is expressed, the circular column is not suitable for information expression due to the same shape of the bottom and the top.

In addition, the switching of the graph display may be triggered by a switching operation of the administrator which is received by the input/output device 240, or may be periodically triggered by the management program, or may be triggered by a failure or the like. Further, in a case where the management program automatically switches the graph display, the automatic switching by the administrator's operation may be temporarily stopped.

<<Detailed Display of System Component Correlation Information>>

Figure 10C:
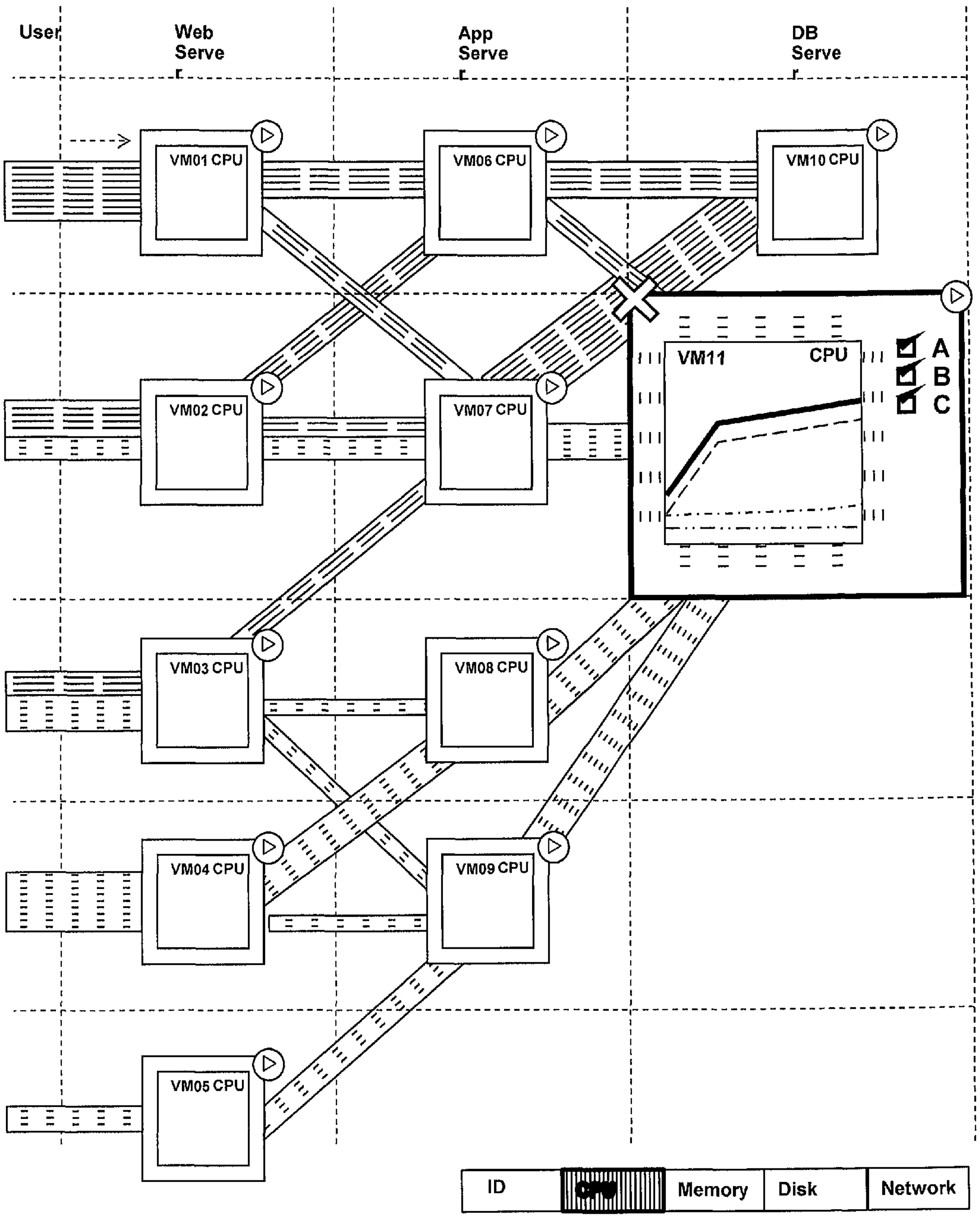
FIG. 10C is a diagram illustrating a third example of the screen display of the Embodiment 1.

As described above, in the graph display method of the monitor value by the system display object of FIG. 10A, the display area of the graph is restricted. Therefore, it is not preferable that the monitor values of too many items are displayed in a graph display area of one system monitor object for the sake of possible visibility. As a display method different from the switching of the graph display by rotating the column or the plate and the magnification of a topology screen, a method of magnifying the display area of a selected system display object will be introduced. FIG. 10C is a diagram illustrating that the system display object of the VM 11 is selected to magnify the display area of the subject system display object, and the detailed information of the system component is displayed in the magnified area. Further, the detailed information may be any type of information. For example, the monitor values differently displayed according to the column or the plate may be integrally displayed in one graph, information which has not been displayed before the graph is magnified may be added to the displayed graph, or the information may be replaced only with the information which has not been displayed before the graph is magnified.

Further, the operational display objects like check buttons may be disposed in the magnified system display object, and the type of information to be displayed in the system display object may be changed according to the operation on the subject object. When the system display object is magnified, the operational display objects may be disposed in a size to make the operation easy using the input/output device 240.

Further, the system display object which is the magnification target is considered to be selected by the management program according to an instruction of the administrator through the input/output device 240. However, as another method, the management program may automatically make a selection by a certain criterion (for example, a selection of the system display object corresponding to the system component in which a failure occurs lately, etc.).

<<<Method of Magnifying System Display Object>>>

Figure 10D:
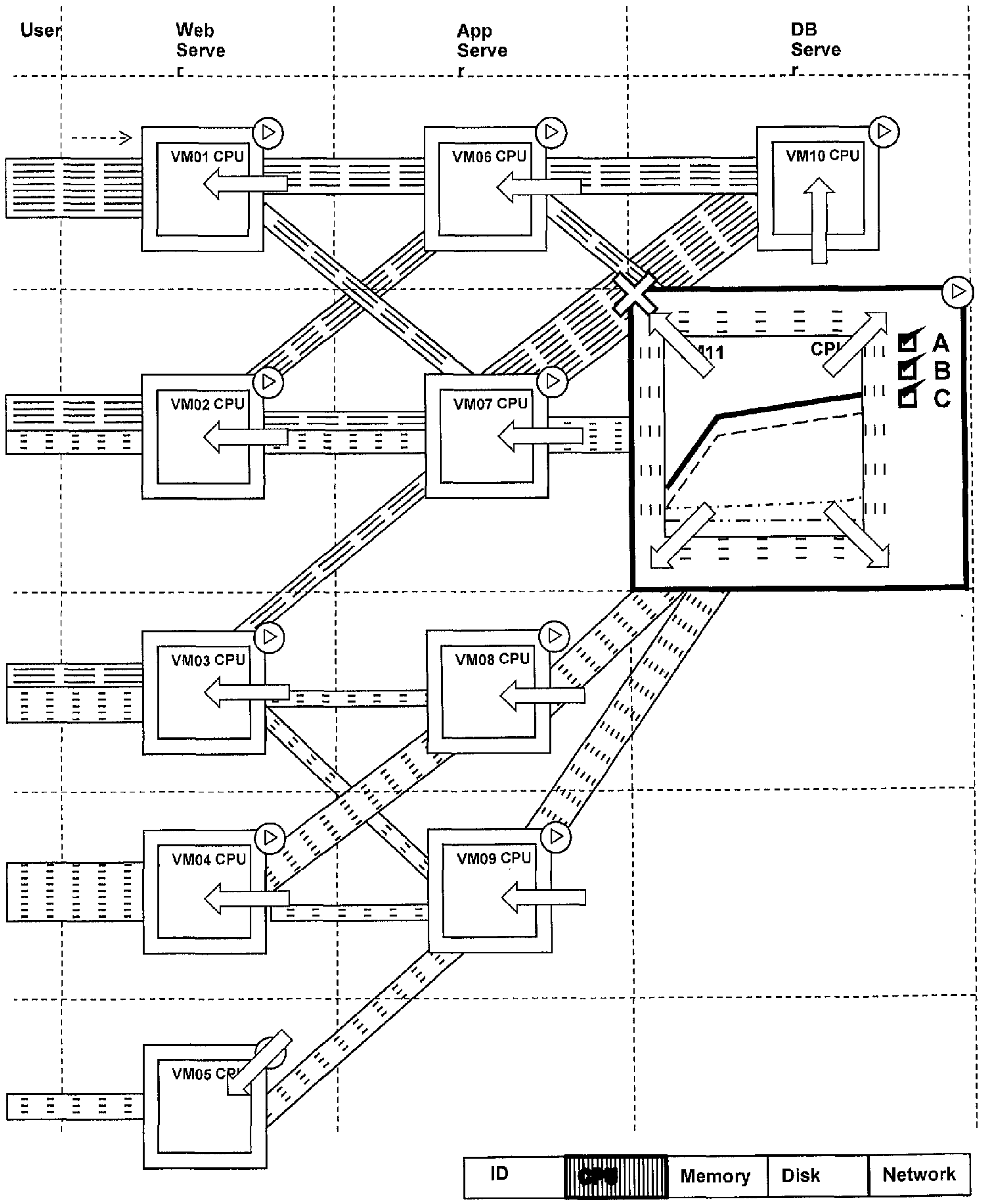
FIG. 10D is a diagram illustrating a fourth example of the screen display of the Embodiment 1.

As described hitherto, since the system display object is displayed as one display object of the topology display, it is not preferable to degrade the visibility of the topology display. In addition, when the topology display is changed before and after the magnification, the administrator strongly feels a sense of incompatibility. In order to avoid such a circumstance as much as possible, the management program changes the topology display using the animation when a predetermined system display object is magnified. FIG. 10D is a diagram illustrating that the animation is produced when the system display object is magnified from FIG. 10B to FIG. 10C. The characteristics of the animation are as follows.

First, the selected system display object is magnified vertically and horizontally up to a determined size. Further, a magnification center is the center of the system display object before the magnification. However, when such a magnification is performed, a distance to the other system display objects disposed in the vicinity is shortened, or the displays are overlapped with each other in some cases. As a result, the length of the band between the selected system display object and the system display object disposed in the vicinity is shortened, or hidden in some cases. In addition, in a case where the displays are overlapped with each other, the other system display objects may be hidden.

As a countermeasure, the management program links the animations of the other system display objects to the animation of the selected system display object and moves the animations so as to secure the display area of the band and avoid the overlapping of the system display objects. By moving the animations of the other system display objects, the administrator easily recognizes the system display objects while associating the topology display after the magnification with the topology display before the magnification.

Further, the system display object disposed in the vicinity is a system display object which is disposed in a predetermined distance (relating to a magnification rate) from the magnification center of the system display object of the magnification target, and a grid adjacent (including the upper and lower portions and the diagonal portions) to the grid where at least the selected system display object is disposed in the arrangement of the grid shape of FIG. 10D.

In the example of FIG. 10D, as the system display object of the VM 11 is magnified, the system display objects disposed in a Web server column and an App server column move to the left side, and the system display object of a VM 10 positioned on the same column as that of the VM 11 moves upward. Further, the system display objects adjacent to the selected system display object on the diagonal line move to the horizontal direction in FIG. 10D, but may move in the vertical direction to maintain the grid shape.

In addition, the display sizes of the other system display objects are not changed in such animations. However, the management program may express the system display objects such that the display sizes of the adjacent system display objects are slightly magnified and the display sizes are slightly magnified as it goes to the system display object of the selection target.

Further, in a case where a display load is increased due to the movement of the other system display objects, the movement of the other system display objects may be omitted.

<<<More Detailed Display>>>

When the information requiring a large area for displaying such as log information of the system component in the detailed display after the display is magnified is displayed in the system display object, the shape of the topology display may be changed compared to the shape before the magnification. Therefore, in this case, as illustrated in FIG. 10E, a more detailed display area is created and displayed on the topology display which has been already displayed.

Figure 10E:
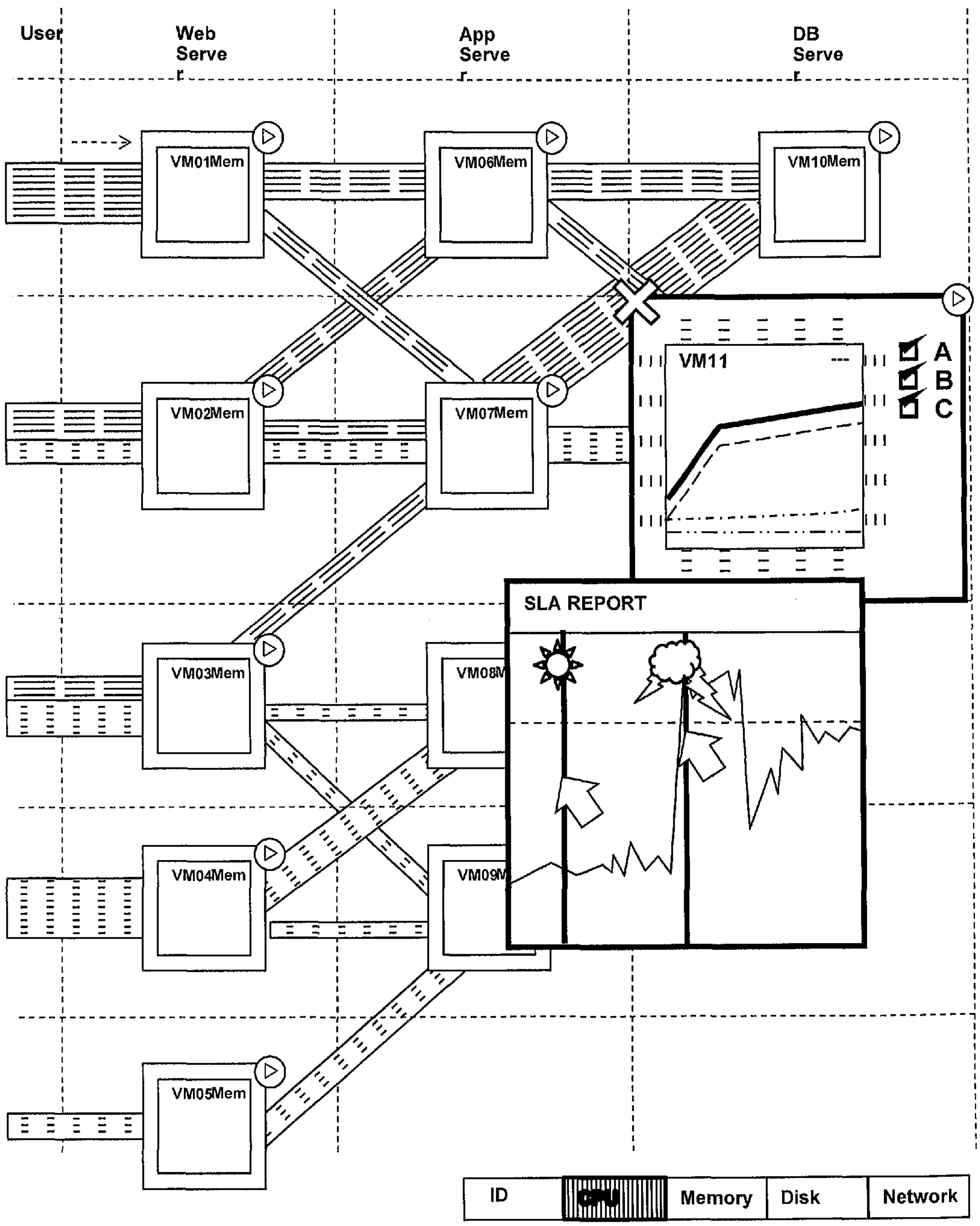
FIG. 10E is a diagram illustrating a fifth example of the screen display of the Embodiment 1.

As an example of a more detailed display, FIG. 10E illustrates a case where an SLA report display using the monitor item of the selected graph line is overlay by selecting the graph of the magnified system display object.

By the way, the SLA report display is at least a display having characteristics as follows.

The graph is a time-sequential graph.

A vertical bar is displayed in the time-sequential graph to designate a time as a display reference indicating the integrity as described below.

The integrity of the management target system is determined based on the reference already described about the time designated by the vertical bar, and the result is displayed by an icon. Further, the icon display is updated in synchronization with the operation on the vertical bar. In addition, in a case where a future time is displayed by the vertical bar, the icon is displayed based on an estimated integrity.

In the example of FIG. 10E, in a case where the vertical bar is positioned on the left side of the graph, "Clear" (that is, a normal icon) is displayed, and when the vertical bar is operated and positioned in the middle of the graph, "Thunder" (that is, an icon imaging an SLA violation) is displayed. Further, as an example other than such an icon, a face icon may be used, and other types of icons may be used as long as the integrity can be expressed.

Hereinbefore, the description has been made about that the display is performed by the management program. Some of the description will be given in detail using a flowchart, and it is a matter of course that also the other portions are performed by the display process of the management program.

<Process Flow of Management Program>

Hereinafter, the flow of various types of processes performed by the management program will be described.

<<Topology Display Process>>

Figure 11:
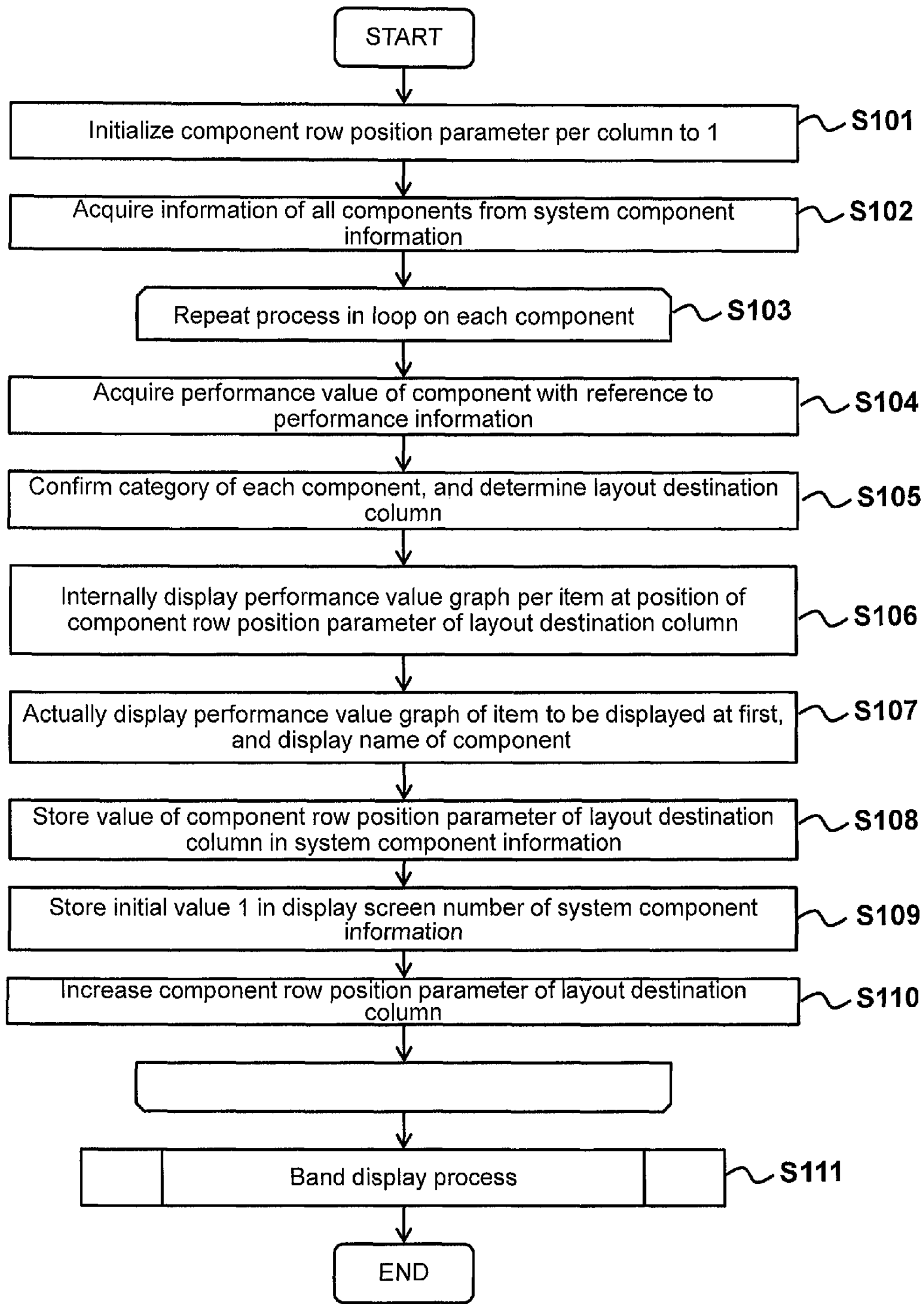
FIG. 11 is a diagram illustrating a flow of a topology display process of the Embodiment 1.

FIG. 11 is a diagram illustrating a flow of the topology display process performed by the management program. Further, this process is performed when the topology display is requested by the administrator. Hereinafter, each step in the flow will be described.

(S101) The management program initializes a component row position parameter (a local parameter) to "1". Further, this parameter is prepared as many as the number of columns, for example, three (that is, the Web server column, the App server column, and the DB server column) in the case of FIG. 10. Further, in the subsequent drawings, the system component in the description will be simply referred to as a "component".

(S102) The management program acquires information of all the system components from the system component information 122.

(S103) The management program performs S104 to S110 on each of the system components acquired in S102 (referred to as an "S103 system component" for convenience sake).

(S104) The management program acquires the performance value (in this case, all items) of the S103 system component with reference to the performance information 124.

(S105) The management program confirms the category of the S103 system component, and determines a layout destination column.

(S106) The management program displays all the items of the graph of the performance value acquired in S104 at a position of the component row position parameter of the layout destination column in order to prepare a graph display switching by a cube (that is, the square column). Further, the display result at this time point may be not displayed by the input/output device, but displayed internally.

(S107) The management program causes the input/output device to display a performance value graph (at this time, the graph of the CPU load corresponding to 1) of the item to be displayed at first from the internally displayed graph, and further display the name of the S103 system component.

(S108) The management program stores a value of the component row position parameter corresponding to the layout destination column at the display position of the S103 system component of the system component information 122.

(S109) The management program stores an initial value 1 in the display screen number of the S103 system component of the system component information 122.

(S110) The management program adds 1 to the component row position parameter corresponding to the layout destination column.

(S111) The management program displays the band. Further, the display process of all the bands in the details of this process will be described with reference to FIG. 12, and a band display process which is performed after FIG. 12 to display an abnormal request will be described with reference to FIG. 13.

Further, the above processes may be performed in a case where an increase or decrease of the system component is detected. Further, in a case where a time value is newly additionally stored in the performance information 124, S102, S103, S106, and S107 may be performed again.

<<<Band Display Process>>>

Figure 12:
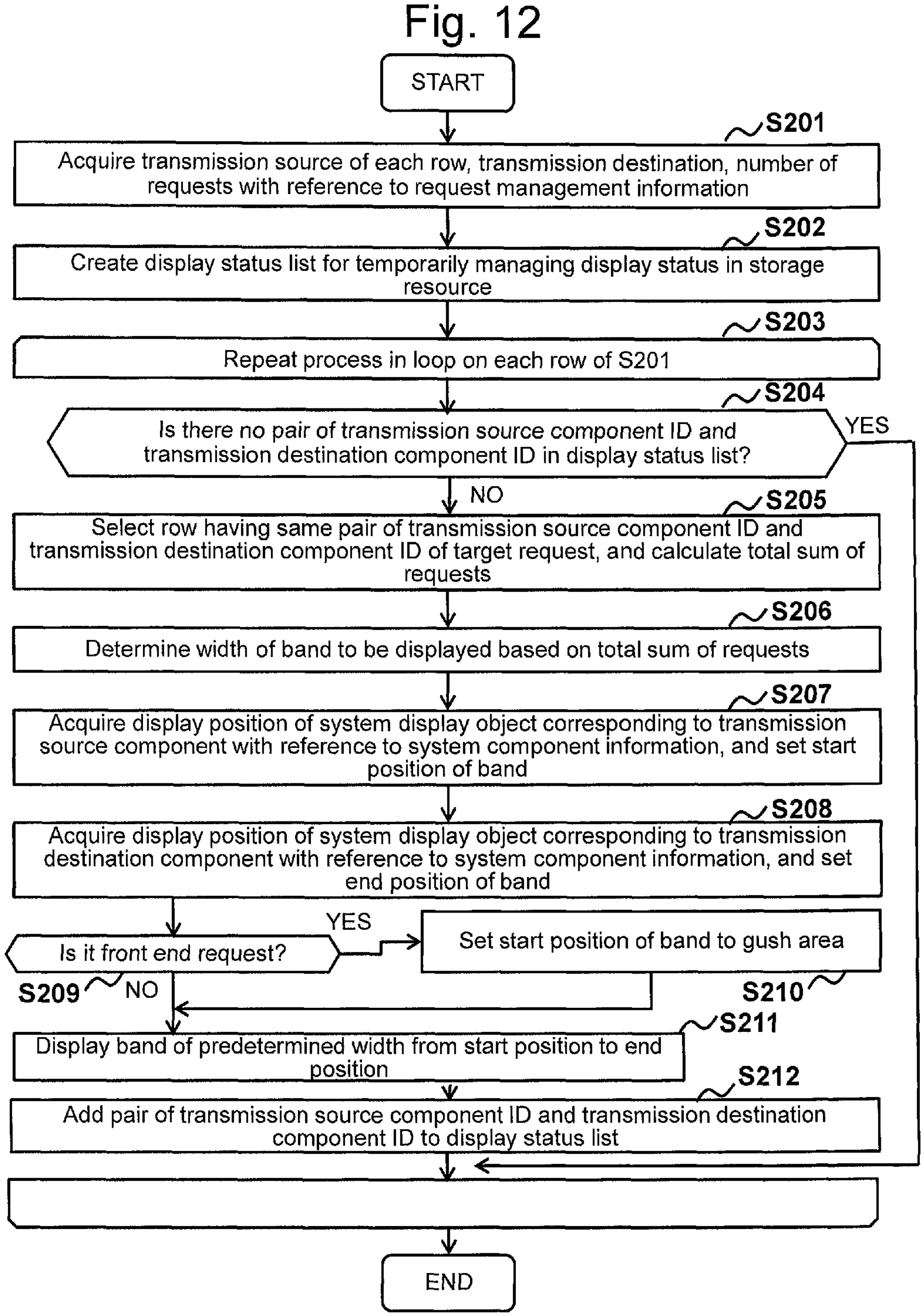
FIG. 12 is a diagram illustrating a flow of a band display process of the Embodiment 1.

FIG. 12 is a diagram illustrating a flow of the band display process performed by the management program. Hereinafter, the flow will be described.

(S201) The management program acquires the transmission source component ID, the transmission destination component ID, the number of requests of each row with reference to the request management information 126.

(S202) The management program creates a display status list for temporarily managing the display status in the storage resource. Further, the list is empty at the time of creating.

(S203) The management program repeatedly performs the processes of S204 to S212 on each row (referred to as an "S201 row" for convenience sake) acquired in S201.

(S204) The management program determines whether a pair of the transmission source component ID and the transmission destination component ID of the S201 row is present in the display status list. Then, in the case of the presence, the processes S205 to S212 of the current S201 row are skipped. In the case of the absence, the process of S205 is performed.

(S205) The management program selects a row having the same pair of the transmission source component ID and the transmission destination component ID of the S201 row which is the request management information 126, and calculates a total sum of the number of requests. Further, the total sum includes the number of requests of the S201 row.

(S206) The management program determines a width of the band which is displayed based on the total sum calculated in S205. Further, as a calculating formula of the width, an equation of "Width=Diameter of System Display Object*Coefficient*Total Sum/Maximum Value" is considered, and another equation may be employed. For example, the management program may be realized using a log function. In addition, the maximum value may be configured by the administrator.

(S207) The management program acquires the display position of the system display object corresponding to the transmission source component from the category and the display position in the system component information corresponding to the transmission source component ID described in the S201 row, and sets the acquired display position as a display start position of the band.

(S208) The management program acquires the display position of the system display object corresponding to the transmission destination component from the category and the display position in the system component information corresponding to the transmission destination component ID described in the S201 row, and sets the acquired display position as a display end position of the band.

(S209, S210) The management program determines whether the request described in the S201 row is the front end request, and in the case of the front end request, configures the display start position of the band in the gush area. Further, the determination on the front end request can be made by determining whether the transmission source component ID of the S201 row is NULL or an ID is stored. Furthermore, specifically, setting the display start position of the band in the gush area is considered as setting the display start position at a specific position in the gush area moved in the horizontal direction from the display end position of the band.

(S211) The management program displays the band having the width determined in S206 at the positions obtained in S207 and S208.

(S212) The management program adds the pair of the transmission source component ID and the transmission destination component ID to the above-mentioned display status list.

<<<Abnormal Band Display Process>>>

Figure 13:
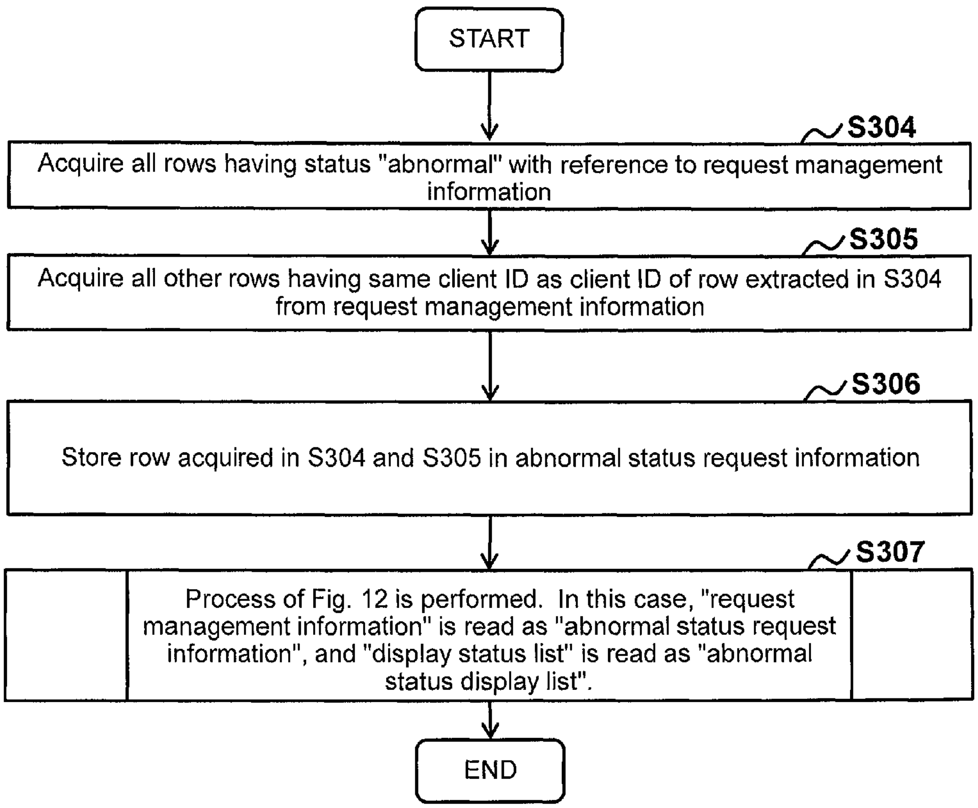
FIG. 13 is a diagram illustrating a flow of an abnormal band display process which is performed after the band display process of the Embodiment 1.

FIG. 13 is a diagram illustrating a display process flow of the band which indicates a request for an abnormal status performed by the management program. Hereinafter, the description will be made along the flow.

(S304) The management program acquires all the rows in which the status of the request management information 126 is abnormal.

(S305) The management program acquires all the rows which include the client ID of the row acquired in S304.

(S306) The management program stores the rows acquired in S304 and S305 in the abnormal status request information.

(S307) The management program performs the process of FIG. 12. In this case, the "request management information" is read as "abnormal status request information", and the "display status list" is read as an "abnormal status display list".

<<Switching Process of Monitor Value Items>>

Next, a process of switching the items of the performance value graph of the system display object will be described.

<<<Switching of all System Display Objects>>>

Figure 14:
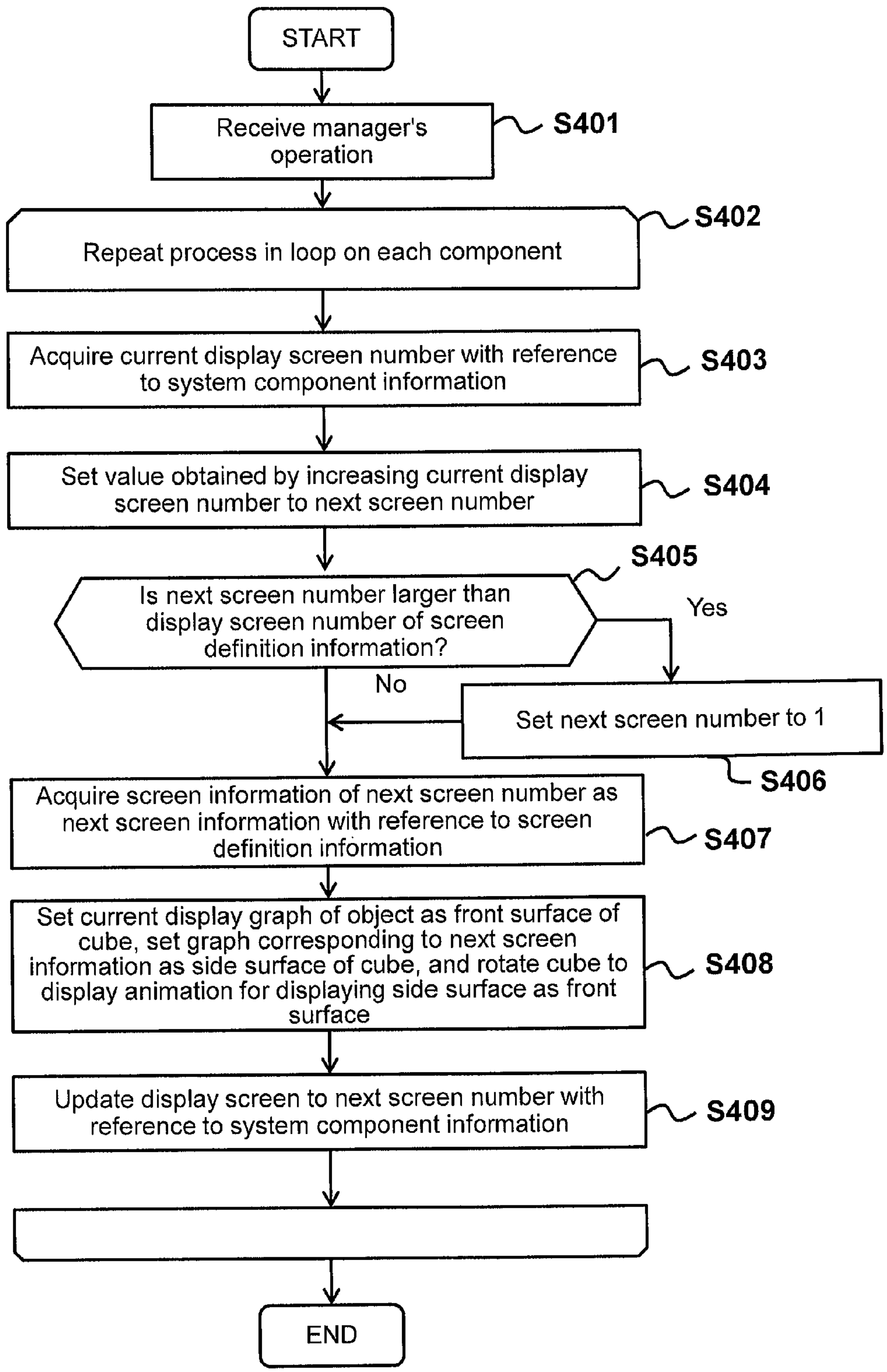
FIG. 14 is a diagram illustrating a flow of a monitor value item update process of the Embodiment 1.

FIG. 14 is a diagram illustrating a switching process flow of the performance value graph of all the system display objects which are included in the topology display. Hereinafter, the description will be made along the flow.

(S401) The management program receives a graph switching operation from the administrator through the input/output device 240.

(S402) The management program performs S403 to S409 on each of all the system components which are included in the system component information 122 (referred to as an "S402 system component" for convenience sake).

(S403) The management program acquires the current display screen number of the S402 system component of the system component information 122.

(S404) The management program configures a value obtained by adding 1 to the current display number to the next screen number.

(S405, S406) The management program configures the next screen number to 1 in a case where the next screen number is determined to be larger than a maximum value of the display screen number of screen definition information 123.

(S407) The management program acquires screen information of the next screen number as the next screen information with reference to the screen definition information 123.

(S408) The management program displays an animation in which the performance value graph in the current display of the system display object is set as the front surface of the cube, the performance value graph corresponding to the next screen information is set to the side surface of the cube, and the cube is rotated to show the side surface on the front surface side.

(S409) The management program updates the display screen number of the system component information 122 to the next screen number.

<<<Another Switching Method of System Display Object>>>

Further, there is no need to switch all the system display objects. For example, the switching may be performed only on the system display object relating to the band which indicates the request for the abnormal status displayed in FIG. 13. Furthermore, the items of the graph to be the switching destination are also not necessary to be the same items in all the objects, and each performance value graph may be switched to the item described in a relevant monitor item of the correlation analysis result information. Since the monitor items having a high correlation are registered in the correlation analysis result information, a problem on the system component can be solved through performing such a switching.

<Detailed Display Process of System Component Correlation Information>

Figure 15A:
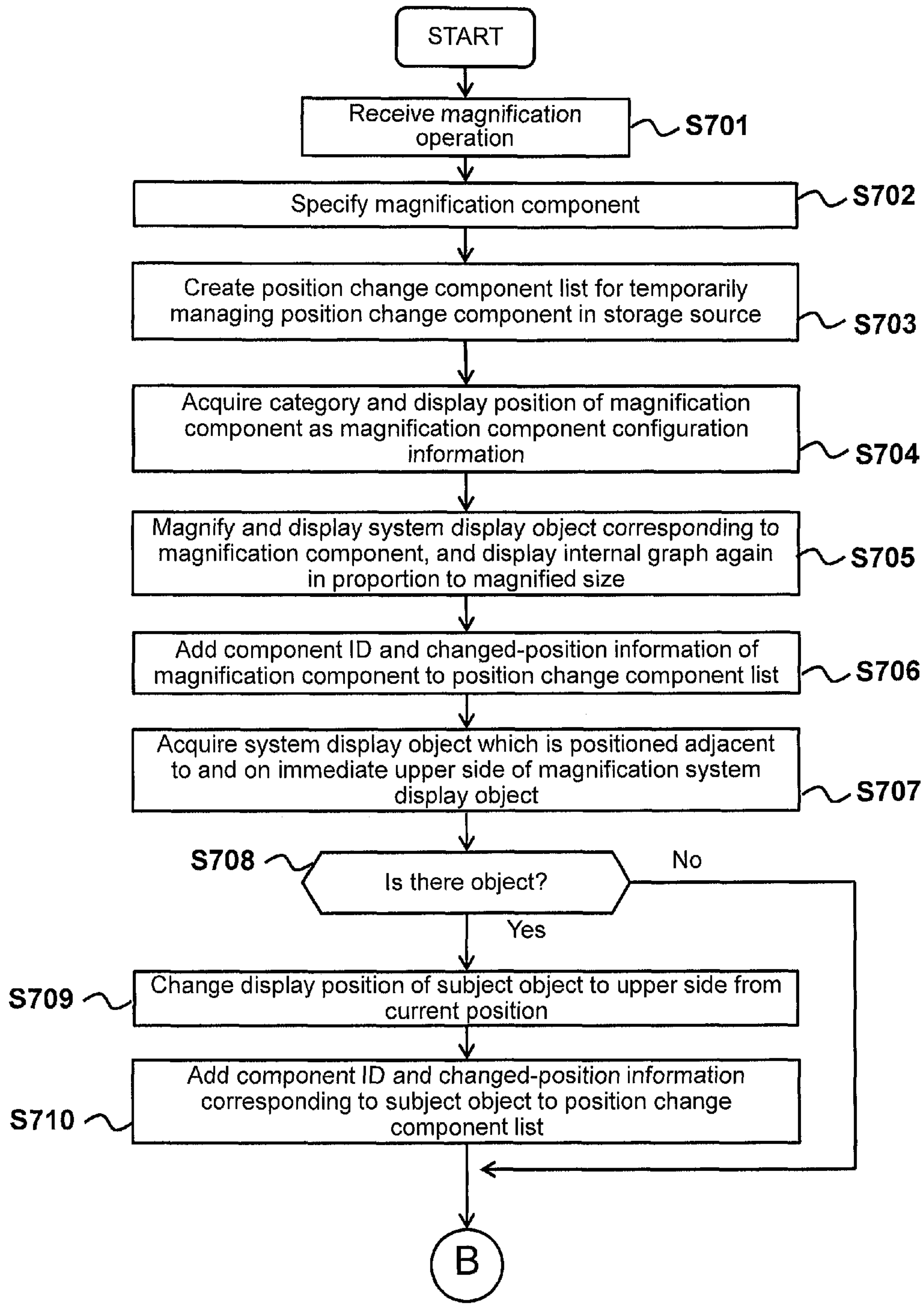
FIG. 15A is a diagram illustrating a first part of a flow of a detailed display process of system component correlation information.
Figure 15B:
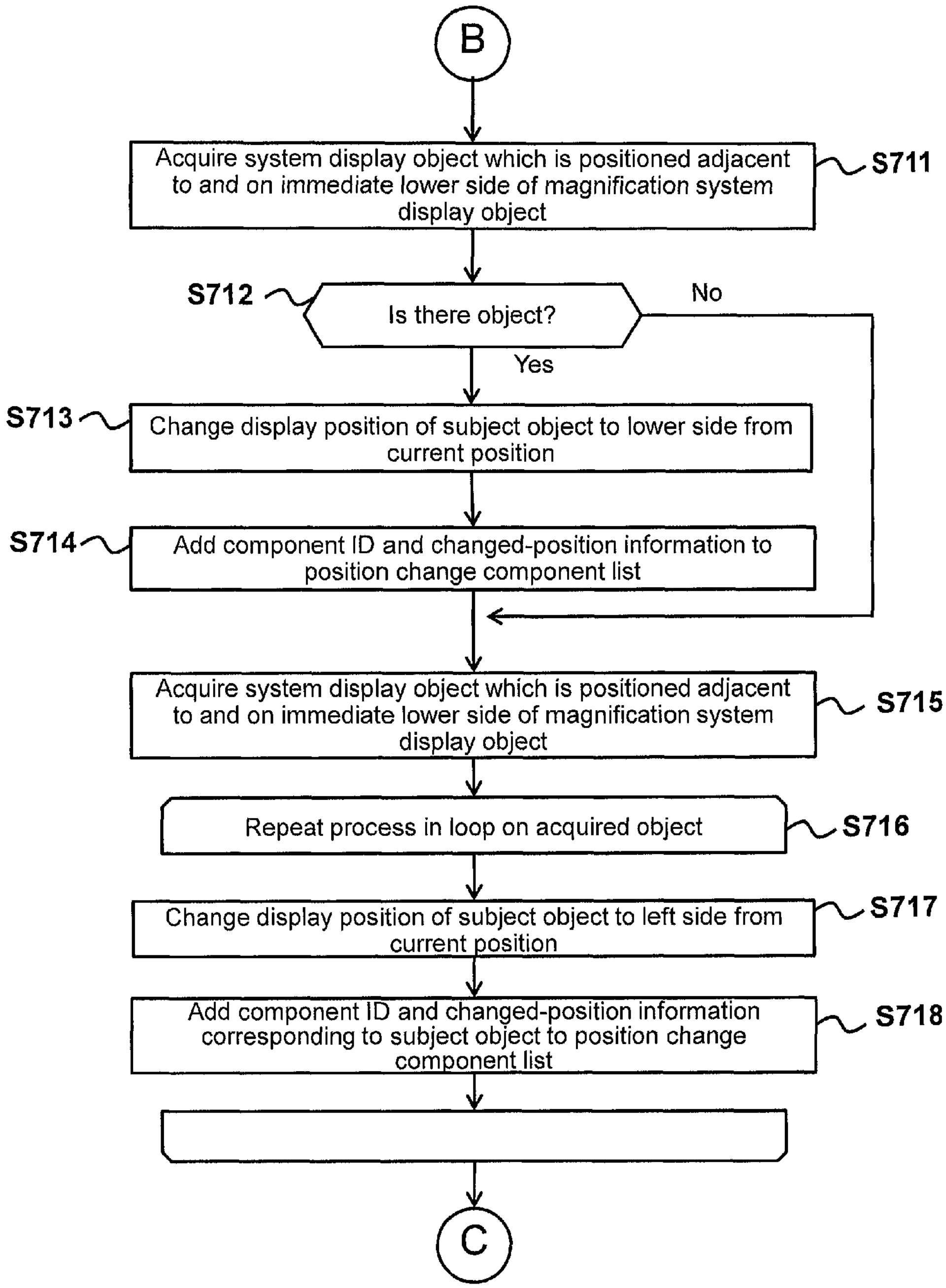
FIG. 15B is a diagram illustrating a second part of a flow of a detailed display process of system component correlation information.
Figure 15C:
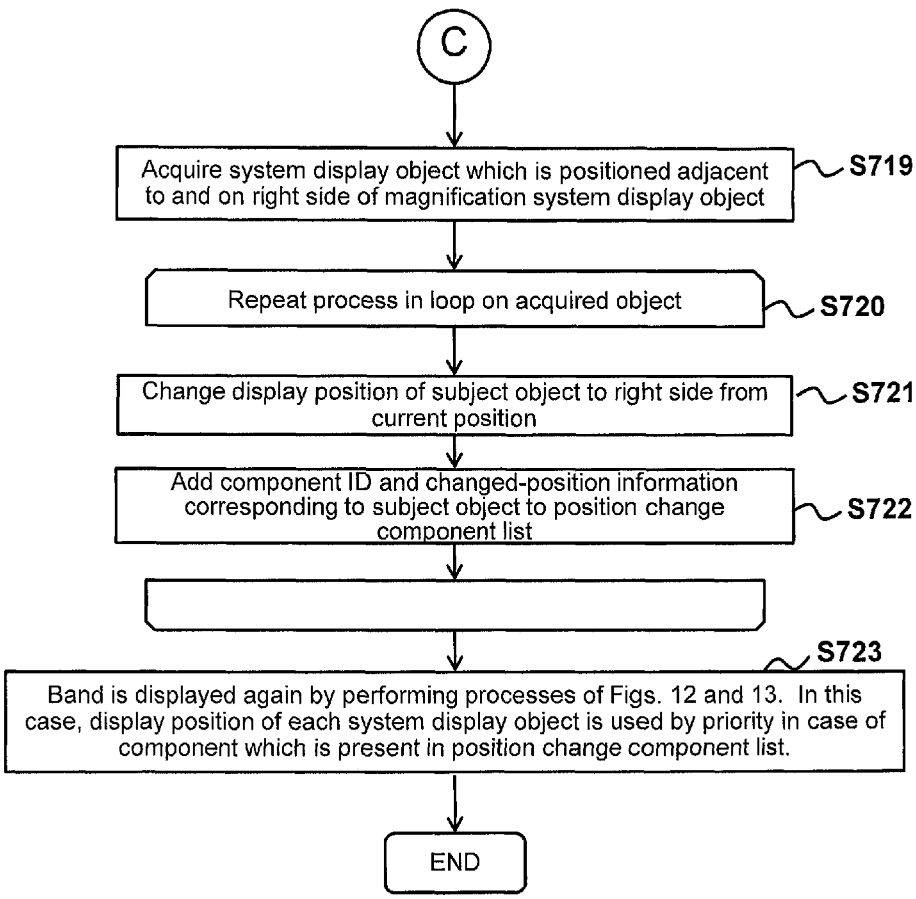
FIG. 15C is a diagram illustrating a remaining part of a flow of the detailed display process of the system component correlation information.

FIGS. 15A to 15C are diagrams illustrating the detailed display process flow of the system component correlation information described in FIGS. 10C and 10D. Hereinafter, the description will be made along the flow.

(S701) The management program receives a magnification operation from the administrator through the input/output device 240.

(S702) The management program specifies a system component (hereinafter, referred to as a "magnification component") of the magnification target from the received magnification operation.

(S703) The management program creates a position change component list for temporarily managing a position change component in the storage resource.

(S704) The management program acquires the category and the display position (hereinafter, referred to as a "magnification component configuration information") of a magnification component from the system component information 122.

(S705) The management program displays the system display object (hereinafter, referred to as a "magnification system display object") corresponding to the magnification component on a magnified scale in the vertical and horizontal directions, and displays the internal graph again in proportion to the magnified size.

(S706) The management program adds the component ID and the changed-position information of the magnification component to the position change component list.

(S707) The management program acquires the system display object which is positioned adjacent to and on the immediate upper side of the magnification system display object.

(S708, S709, S710) In a case where there is an object corresponding to S707, the management program changes the display position of the subject object to the upper side from the current position. Then, the management program adds the component ID and the changed-position information corresponding to the subject object to the position change component list.

(S711) The management program acquires the system display object which is positioned adjacent to and on the immediate upper side of the magnification system display object.

(S712, S713, S714) In a case where there is an object corresponding to S711, the management program changes the display position of the subject object to the lower side from the current position. Then, the management program adds the component ID and the changed-position information corresponding to the subject object to the position change component list.

(S715) The management program acquires the system display object which is positioned adjacent to and on the immediate left, left upper, or left lower side of the magnification system display object.

(S716, S717, S718) The management program changes the display position of each object corresponding to S715 to the left side from the current position. Then, the management program adds the component ID and the changed-positioned information corresponding to the subject object to the position change component list.

(S719) The management program acquires the system display object which is positioned adjacent to and on the immediate right, right upper, or right lower side of the magnification system display object.

(S720, S721, S722) The management program changes the display position of each object corresponding to S719 to the right side from the current position. Then, the management program adds the component ID and the changed-position information corresponding to the subject object to the position change component list.

(S723) The management program displays the band again by performing the processes of FIGS. 12 and 13. In this case, the display position of each system display object is used by priority in the case of the component which is present in the position change component list.

Hitherto, the embodiments have been described. Further, the topology display of the embodiments may be displayed in the entire screen, or may be displayed in a part of the screen. Furthermore, the graph disclosed in PTL 1 other than the topology display of the embodiments may be displayed. Furthermore, the graph display may be performed by selecting the graph displayed in the topology display using a grip or the like and then releasing the selected graph in a graph area outside the topology display.

REFERENCE SIGNS LIST

100 Management computer
200 Displaying computer
300 Management target system
400 Network

The invention claimed is:

1. A management system which manages a management target system, comprising:

a storage resource configured to store a management program;

a CPU configured to execute the management program; and an input/output device, wherein the CPU, when the management program is executed, is caused to:

repeatedly receive a plurality of monitor values from a plurality of system components, one or more of the system components monitoring a plurality of items, included in the management target system so as to store a history of the respective monitor values in the storage resource;

display a plurality of system display objects indicating the system components on the input/output device;

display a plurality of relations between the plurality of system display objects indicating the system components, and display a plurality of graphs of the history of the monitor values which have been acquired from the system components indicated by the system display objects on the input/output device, the graphs being displayed on corresponding ones of the system display objects and containing the history of monitor values of one of the system components indicated by one of the system display objects;

detect a first trigger for changing a first graph, which is displayed in a first system display object among the system display objects indicating a first system component among the system components, from a first item to a second item among the plurality of items;

change the display of the first graph from the first item to the second item in response to the detection of the first trigger by rotating the first system display object;

select a second system display object among the system display objects indicating a second system component among the system components and relating to the first system component in response to the detection of the first trigger;

change the display of a second graph among the graphs which is displayed in the second system display object from the first item to the second item in response to the detection of the first trigger by rotating the second system display object;

detect a second trigger for displaying detailed information of the first system component;

magnify a size of the first system display object by using an animation, and display the detailed information in the magnified first system display object; and move a position of the second system display object so as not to be overlapped with the magnified first system display object.

2. The management system according to claim 1, wherein the change of the display of the graph included in the first system display object is performed by rotating the first system display object, which is a three-dimensional shape, by a multiple of 90° so as to be switched from the graph of the first item which is displayed on a first outer side surface of the three-dimensional shape to the graph of the second item which is displayed on a second outer side surface of the three-dimensional shape.

3. The management system according to claim 1, wherein the CPU is further caused to:

move the second system display object in an upper direction in a case where the second system display object is displayed to an upper side of the first system display object, move the relevant system display object in a lower direction in a case where the second system display object is displayed to a lower side of the first system display object, move the second system display object move in a left direction in a case where the second system display object is displayed to a left side of the first system display object, and move the second system display object in a right direction in a case where the second system display object is displayed to a right side of the first system display object.

4. The management system according to claim 3, wherein the CPU is further caused to:

detect a third trigger for displaying additional detailed information of the first system component after the magnification of the first system display object, and display the additional detailed information of the first system component in an overlapping manner with at least one other of the system display objects.

5. The management system according to claim 4, wherein the CPU is further caused to:

receive information with respect to a request transmitted or received within a unit time by the first system component, and determine a width of a band indicating the respective relation between the first system component and another one of the system components based on at least a number of requests, the band being displayed between the first system display object and the other one of the system display objects or an outside of the management target system, and wherein each of the relations is indicated by a respective band having a determined width.

6. The management system according to claim 5, wherein the CPU is further caused to:

specify a request from among the requests according to a predetermined process, and change a color of the band indicating the respective relation between the first system display object and the other one of the system display objects or the outside of the management target system based on the specified request.

7. The management system according to claim 6, wherein the specified request is filtered under a predetermined condition from all of the requests which are received or transmitted by the first system component.

8. The management system according to claim 4, wherein the CPU is further caused to:

display the additional detailed information or the monitor values as a time-sequential graph, display a vertical bar in the time-sequential graph, when an operation of the vertical bar is detected by the input/output device, specify a time indicated by the vertical bar after the operation, determine an integrity of a response to the request of the specified time based on a reference for determining the integrity of the response to the request received by the management target system from the outside, and display an icon indicating the determined integrity over or near the vertical bar.

9. The management system according to claim 8, wherein the time-sequential graph indicates an estimated value which is calculated based on the monitor values from a previous time in the past up to a current time, in a case where the specified time is in the past, the determination of the integrity is made based on at least the monitor values of the past, and in a case where the specified time is in the future, the determination on the integrity is made based on the estimated value.

10. A method for managing a management target system by a management system, the management system performing the method comprising:

repeatedly receiving a plurality of monitor values from a plurality of system components, one or more of the system components monitoring a plurality of items, included in the management target system so as to store a history of the respective monitor values in the storage resource;

displaying a plurality of system display objects indicating the system components on the input/output device;

displaying a plurality of relations between the plurality of system display objects indicating the system components, and displaying a plurality of graphs of the history of the monitor values which have been acquired from the system components indicated by the system display objects on the input/output device, the graphs being displayed on corresponding ones of the system display objects and containing the history of monitor values of one of the system components indicated by one of the system display objects;

detecting a first trigger for changing a first graph, which is displayed in a first system display object among the system display objects indicating a first system component among the system components, from a first item to a second item among the plurality of items;

changing the display of the first graph from the first item to the second item in response to the detection of the first trigger by rotating the first system display object;

selecting a second system display object among the system display objects indicating a second system component among the system components and relating to the first system component in response to the detection of the first trigger;

changing the display of a second graph among the graphs which is displayed in the second system display object from the first item to the second item in response to the detection of the first trigger by rotating the second system display object;

detecting a second trigger for displaying detailed information of the first system component;

magnifying a size of the first system display object by using an animation, and display the detailed information in the magnified first system display object in response to the detection of the first trigger in response to the detection of the second trigger; and moving a position of the second system display object so as not to be overlapped with the magnified first system display object.

11. A management program of a management target system, when executed by a management system which includes a storage resource, a CPU, and an input/output device, the program causing the CPU to perform acts comprising:

repeatedly receiving a plurality of monitor values from a plurality of system components, one or more of the system components monitoring a plurality of items, included in the management target system so as to store a history of the respective monitor values in the storage resource;

displaying a plurality of system display objects indicating the system components on the input/output device;

displaying a plurality of relations between the plurality of system display objects indicating the system components, and displaying a plurality of graphs of the history of the monitor values which have been acquired from the system components indicated by the system display objects on the input/output device, each one of the graphs being displayed on corresponding ones of the system display objects and containing the history of monitor values of one of the system components indicated by one of the system display objects;

detecting a first trigger for changing a first graph, which is displayed in a first system display object among the system display objects indicating a first system component among the system components, from a first item to a second item among the plurality of items;

changing the display of the first graph from the first item to the second item in response to the detection of the first trigger by rotating the first system display object;

selecting a second system display object among the system display objects indicating a second system component among the system components and relating to the first system component in response to the detection of the first trigger;

changing the display of a second graph among the graphs which is displayed in the second system display object from the first item to the second item in response to the detection of the first trigger by rotating the second system display object;

detecting a second trigger for displaying detailed information of the first system component;

magnifying a size of the first system display object by using an animation, and display the detailed information in the magnified first system display object in response to the detection of the second trigger; and moving a position of the second system display object so as not to be overlapped with the magnified first system display object.

* * * * *